US009694849B2

(12) United States Patent
Kuras et al.

(10) Patent No.: US 9,694,849 B2
(45) Date of Patent: Jul. 4, 2017

(54) STEERING CONTROL SYSTEM FOR MULTI-PATH ELECTRIC DRIVE

(71) Applicant: Caterpillar Inc., Peoria, IL (US)

(72) Inventors: Brian Dean Kuras, East Peoria, IL (US); Sangameshwar Sonth, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/955,510

(22) Filed: Dec. 1, 2015

(65) Prior Publication Data

US 2017/0151980 A1    Jun. 1, 2017

(51) Int. Cl.
*B62D 1/12* (2006.01)
*B62D 6/00* (2006.01)
*B62D 11/04* (2006.01)
*B62D 11/00* (2006.01)
*B62D 6/10* (2006.01)
*B62D 55/08* (2006.01)

(52) U.S. Cl.
CPC .............. *B62D 11/003* (2013.01); *B62D 6/10* (2013.01); *B62D 11/04* (2013.01); *B62D 55/08* (2013.01)

(58) Field of Classification Search
CPC ...... B62D 11/003; B62D 11/04; B62D 55/08; B62D 6/10
See application file for complete search history.

(56) References Cited

U.S. PATENT DOCUMENTS

| 5,487,437 A * | 1/1996 | Avitan | B62D 11/04 180/6.28 |
| RE36,151 E * | 3/1999 | Ishino | B62D 11/183 180/6.44 |
| 6,148,939 A * | 11/2000 | Brookhart | B62D 11/183 180/333 |
| 7,578,361 B2 | 8/2009 | Thacher | |
| 8,157,033 B2 * | 4/2012 | Gilbert | B62D 11/18 180/6.48 |
| 8,768,551 B2 | 7/2014 | Yamamoto | |
| 8,905,884 B2 | 12/2014 | Noguchi et al. | |
| 8,909,387 B2 | 12/2014 | Ikeya | |
| 8,989,981 B2 | 3/2015 | Yamakado et al. | |
| 2010/0120578 A1 * | 5/2010 | Bouguerra | B62D 11/003 477/1 |
| 2014/0145498 A1 | 5/2014 | Yamakado et al. | |

* cited by examiner

*Primary Examiner* — Michael J Zanelli
(74) *Attorney, Agent, or Firm* — Jeff A. Greene; Finnegan, Henderson, Farabow, Garrett & Dunner, LLP

(57) ABSTRACT

A steering control system is disclosed for use with a machine. The steering control system may have left and right motors, at least one input device configured to generate first and second signals indicative of desired speed and desired steering, a left speed sensor configured to generate a third signal, and a right speed sensor configured to generate a fourth signal. The steering control system may further have a controller configured to determine a difference between desired and actual steering based on the second, third, and fourth signals, to determine a steering command change that should be implemented based on the difference, and to determine a gain based on the second signal. The controller may also be configured to adjust the steering command change as a function of the gain, and to selectively apply the adjusted steering command change to one of the left and right motors.

17 Claims, 3 Drawing Sheets

STEERING CONTROL SYSTEM FOR MULTI-PATH ELECTRIC DRIVE

TECHNICAL FIELD

The present disclosure relates generally to a steering control system and, more particularly, to a steering control system for a machine having a multi-path electric drive.

BACKGROUND

Electric drive machines are quickly replacing mechanical drive machines both in on-highway and off-highway applications. An electric drive machine consists generally of an engine drivingly coupled to a generator. As a mixture of fuel and air is burned within the engine, a mechanical rotation is created that drives the generator to produce electric power. The electric power is sent to one or more motors associated with traction devices of the machine to propel and steer the machine.

Conventionally, the speed of an electric drive machine is controlled by commanding the motors to produce a particular torque. However, in a multi-path drive system, where each motor is independently controlled, a difference in output speeds of the motors can be observed as the motors encounter varying torque loads. This difference in output speeds can result in unintended steering of the associated machine.

One attempt to control steering in a dual-path electric drive machine is disclosed in U.S. Pat. No. 7,578,361 (the '361 patent) that issued to Thacher on Aug. 25, 2009. In particular, the '361 patent discloses a differential steering assist system for an off-road utility vehicle. The off-road utility vehicle includes left and right front wheels that are steerable, and left and right rear wheels that are independently driven by associated electric motors based on differences between commanded and desired output torque. The differential steering assist system uses a steering position sensor to sense a steering position of the front wheels, and wheel speed sensors to sense the speeds of the rear wheels. An electronic control unit selectively provides speed-reducing commands to the left or right rear wheels based on the steering position and the wheel speeds to thereby assist the vehicle in steering.

Although the differential steering assist system of the '361 patent may help an off-road utility vehicle during intentional steering, it may have limited applicability and benefit. In particular, the system may only be applicable to a vehicle that has steerable front wheels. In addition, the system may not help maintain straight travel of the vehicle when steering is undesired.

The disclosed steering control system is directed to overcoming one or more of the problems set forth above and/or other problems of the prior art.

SUMMARY

In one aspect, the present disclosure is directed to a steering control system for use with a machine having left and right traction devices. The steering control system may include a left motor configured to drive the left traction device, and a right motor configured to drive the right traction device. The steering control system may also include at least one input device configured to generate a first signal indicative of a desired machine speed and a second signal indicative of desired machine steering, a left speed sensor configured to generate a third signal indicative of a rotational speed of the left motor, and a right speed sensor configured to generate a fourth signal indicative of a rotational speed of the right motor. The steering control system may further include a controller in communication with the left motor, the right motor, the at least one input device, the left speed sensor, and the right speed sensor. The controller may be configured to determine a difference between desired machine steering and actual machine steering based on the second, third, and fourth signals; to determine a steering command change that should be implemented based on the difference; and to determine a gain based on the second signal. The controller may also be configured to adjust the steering command change as a function of the gain, and to selectively apply the adjusted steering command change to one of the left and right motors.

In another aspect, the present disclosure is directed to a method of controlling steering of a machine having an electric drive with left and right motors. The method may include receiving input indicative of a desired speed and a desired steering of the machine, sensing a rotational speed of the left motor, and sensing a rotational speed of the right motor. The method may also include determining a difference between desired steering and actual steering based on the input indicative of the desired steering, the rotational speed of the left motor, and the rotational speed of the right motor. The method may further include determining a steering command change that should be implemented based on the difference, determining a gain based on the desired steering, and adjusting the steering command change as a function of the gain. The method may additionally include selectively applying the adjusted steering command change to one of the left and right motors.

In yet another aspect, the present disclosure is directed to a machine. The machine may include a frame, an undercarriage configured to support the frame and having left and right tracks, an engine mounted to the frame, and a generator mounted to the frame and driven by the engine to produce electricity. The machine may also include a left traction motor configured to receive electricity produced by the generator and to drive the left track, and a right traction motor configured to receive electricity produced by the generator and to drive the right track. The machine may further include at least one input device configured to generate a first signal indicative of a desired machine speed and a second signal indicative of desired machine steering, a left speed sensor configured to generate a third signal indicative of a rotational speed of the left motor, a right speed sensor configured to generate a fourth signal indicative of a rotational speed of the right motor, and a controller in communication with the left motor, the right motor, the at least one input device, the left speed sensor, and the right speed sensor. The controller may be configured to determine a difference between desired machine steering and actual machine steering based on the second, third, and fourth signals, to determine a deadband based on the first signal and based on a difference between current torque commands of the left and right motors, and to reduce the difference by the deadband. The controller may also be configured to determine a steering command change that should be implemented based on the deadband-reduced difference, to determine a gain based on the second signal and based on a difference between current torque commands of the left and right motors, and to adjust the steering command change as a function of the gain. The controller may further be configured to make a comparison of a sign of the steering command change to a sign of the first signal, to selectively add the adjusted steering command change to a current steering command of the left motor when the comparison indicates the sign of the steering command change is the opposite of the sign of the first signal, and to selectively subtract the adjusted steering command change from a current steering command of the right motor when the comparison indicates the sign of the steering command change is the same as the sign of the first signal.

BRIEF DESCRIPTION OF THE DRAWINGS

FIGS. 3-6 are exemplary disclosed control charts that may be referenced by the steering control system of FIG. 1 during implementation of the method of FIG. 2.

DETAILED DESCRIPTION

Figure 1:
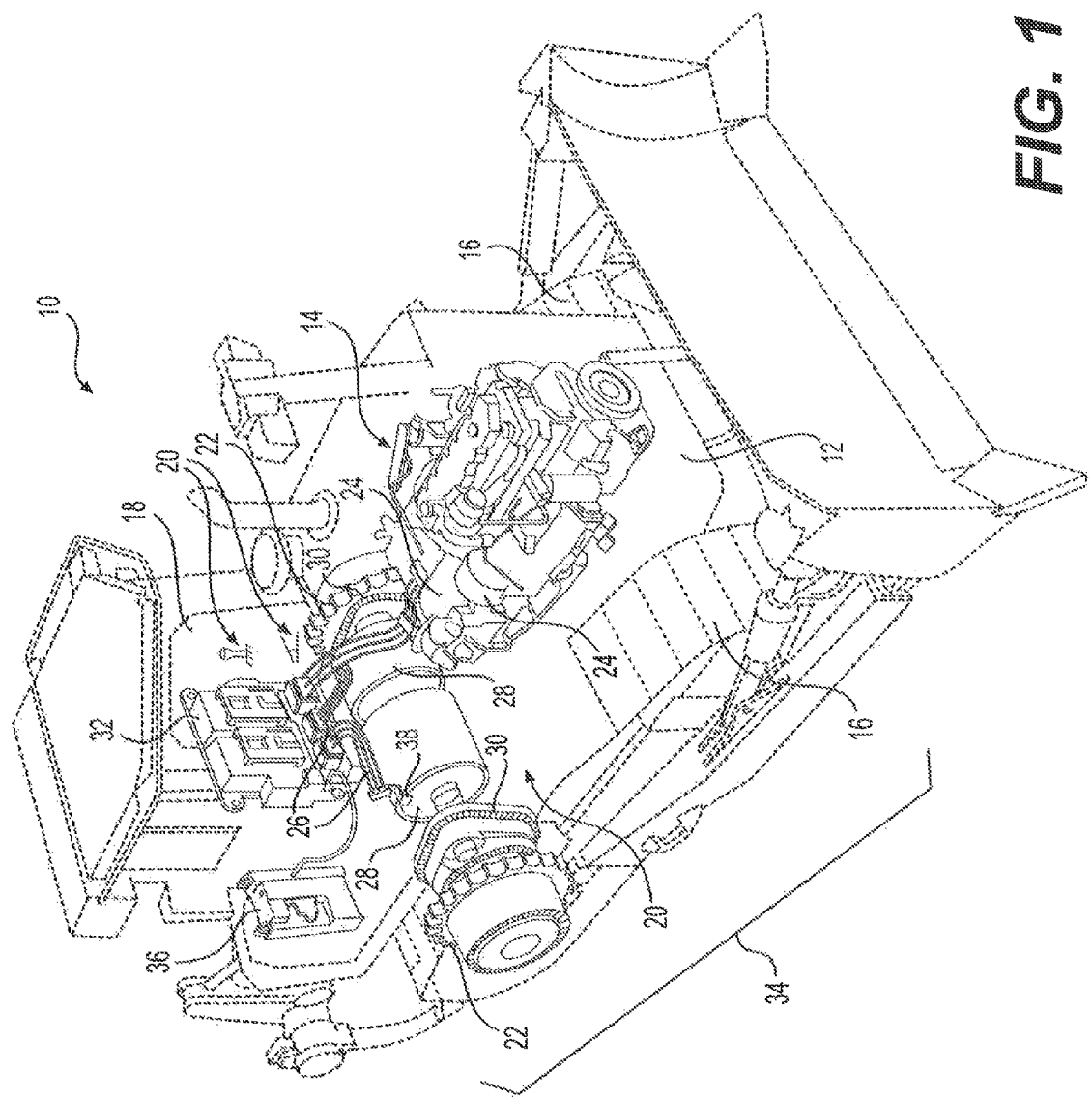
FIG. 1 is a pictorial illustration of a machine equipped with an exemplary disclosed steering control system.

FIG. 1 illustrates an exemplary machine 10. Machine 10 may be a mobile machine that performs some type of operation associated with an industry such as mining, construction, farming, transportation, or another industry known in the art. For example, machine 10 may be an earth-moving machine such as a track-type dozer, loader, excavator, agricultural tractor, or haul machine. Machine 10 may include, among other things, a frame 12, an engine 14 mounted to frame 12, left and right traction devices 16 operatively driven by engine 14, and an operator cabin 18 supported above frame 12. Operator cabin 18 may house any number and type of input devices 20 for use by the operator in controlling movements of machine 10. Exemplary input devices 20 include a joystick and/or an accelerator pedal configured to generate signal(s) indicative of an operator's desire to propel (e.g., to implement a desired speed and/or steering of) machine 10.

As shown in the example of FIG. 1, the disclosed traction devices 16 embody parallel tracks located at opposing sides of frame 12. Each track may comprise a plurality of crawler shoes pinned end-to-end to form an endless loop that wraps around a corresponding sprocket 22. Sprocket 22 may engage pins (or engage bushings that encase the pins) of the crawler shoes and thereby transmit torque to traction device 16. Straight travel of machine 10 may be initiated by creating substantially equal rotational speeds of sprockets 22, while steering may be initiated by creating a speed differential between sprockets 22. Traction devices 16 may not be otherwise steerable.

Machine 10 may have a multi-path electric drive. That is, each of traction devices 16 may be independently driven via electricity produced by a common generator 24, which is operatively connected to engine 14. Electricity from generator 24 may be directed onto one or more buses 26, from which left and right traction motors 28 selectively draw power. Traction motors 28 may be connected to mechanically drive sprockets 22. In some embodiments, a final drive 30 may be disposed between motors 28 and sprockets 22, if desired.

Traction motors 28 may be generally operable to receive AC power from generator 24 via a converter 32 and buses 26. For example, traction motors 28 may embody AC induction motors connected to receive three-phase AC power from converter 32, and to generate an output having a rotational torque in accordance with a commanded torque.

It is contemplated that traction motors 28 may alternatively embody another type of AC or DC motor, if desired.

Converter 32 may generally embody a three-phase converter with controllable frequency and/or voltage parameters, such that a frequency and/or voltage of the AC power generated and/or received by converter 32 may be controllably set, as is known in the art. Converter 32 may include solid state electronics and be connected to traction motors 28 and to generator 24 by dedicated or shared buses 26.

Machine 10 may be equipped with a steering control system 34 having multiple components that interact to control the motion of traction devices 16. These components may include, among other things, input devices 20, traction motors 28, a controller 36, and one or more sensors 38. As will be described in more detail below, controller 36 may selectively direct speed commands to traction motors 28 based on signals received from input devices 20 and sensors 38 to implement operator-desired motions of machine 10.

For example, controller 36 may be configured to affect an independent output of each traction motor 28 in response to an actual rotational speed of motors 28 (as detected by sensors 38) and an operator desired speed of machine 10 (as received from input device 20). In particular, as machine 10 encounters a steep incline and the travel speed of machine 10 slows down from an operator desired speed, controller 36 (or separate motor controllers—not shown) may detect the reduction in speed and responsively command an increased torque output of traction motors 28. Based on the command for increased torque output, each of traction motors 28 may draw more power from the associated power bus 26 and increase its torque output until the actual travel speed of traction device 16 generally matches the desired travel speed. A sudden increase in detected travel speed may similarly result in a command for less torque output from traction motor 28 by controller 36.

Figure 2:
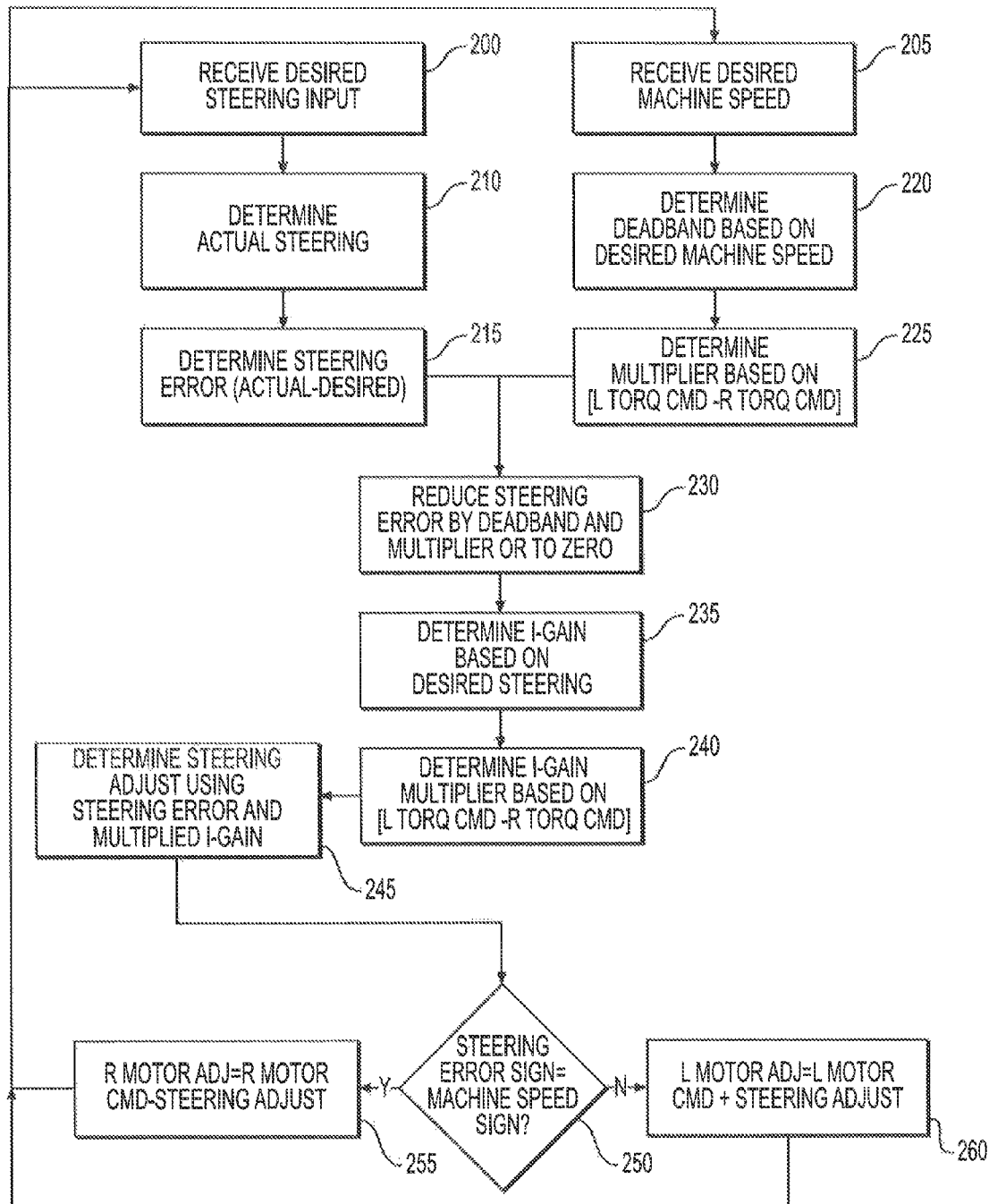
FIG. 2 is a flowchart of an exemplary disclosed method of steering control that may be implemented by the system of FIG. 1.

When traction devices 16 experience uneven loading, however, the resulting speed difference between traction devices 16 may cause undesired steering. When this happens, and also when intentional steering is requested, controller 36 may be configured to implement a control method that either inhibits and/or corrects the undesired steering or implements the desired steering. This control method is depicted in FIG. 2. One or more maps may be stored in the memory of controller 36 and used during completion of the method shown in FIG. 2. Each of these maps may include a collection of data in the form of tables, graphs, and/or equations. In the disclosed embodiment, at least four different maps are used by controller 36 and shown in FIGS. 3, 4, 5, and 6. The method of FIG. 2 and the maps of FIGS. 3-6 will be discussed in more detail in the following section to further clarify the disclosed concepts.

Controller 36 may embody a single or multiple microprocessors, field programmable gate arrays (FPGAs), digital signal processors (DSPs), etc. that form one or more modules for controlling various operations of steering control system 34. Numerous commercially available microprocessors can be configured to perform the functions of controller 36. It should be appreciated that controller 36 could readily embody a microprocessor separate from that controlling other machine functions or that controller 36 could be integral with a general machine microprocessor and be capable of controlling numerous machine functions and modes of operation. If separate from the general machine microprocessor, controller 36 may communicate with the general machine microprocessor via datalinks or other methods. Various other known circuits may be associated with controller 36, including power supply circuitry, signal-conditioning circuitry, actuator driver circuitry (i.e., circuitry powering solenoids, motors, or other actuators), communication circuitry, and other appropriate circuitry.

Controller 36, in the disclosed embodiment, is a PID (Proportional Integral Derivative) type of controller, that utilizes different gain parameters to adjust the way in which the torque commands of traction motors 28 are determined and/or varied. Specific to disclosed embodiments, controller 36 may utilize three different gain parameters, including a $K_P$ parameter, a $K_I$ parameter, and a $K_D$ parameter. The $K_P$ parameter is a feedback component, which generally corresponds with an amount of change that should be implemented in a current control cycle (n) based on an amount of steering error ($\Delta S$) measured between desired steering and actual steering (derived from an actual motor speed differential) calculated during a previous iteration (n−1) of the control cycle. The $K_I$ parameter (a.k.a., the I-gain) generally corresponds with an amount of change that should be implemented based on an accumulation of steering error ($\Delta S$) over time. In other words, the $K_I$ parameter may function as a control element that affects an integral action, whose purpose is to drive steady-state error (i.e., the difference between desired steering and actual steering) to zero. As will be described in more detail below, controller 36 may determine the $K_I$ parameter during each cycle iteration based on steering input, speed input, sensed speeds, and one or more of the control maps of FIGS. 3-6 stored in memory. The $K_D$ parameter may affect a derivative action, whose purpose is to stabilize the system and reduce overshoot in transient response. The $K_D$ parameter may be calculated and/or pulled from a lookup table during each iteration of the process depicted in FIG. 2, based on an accumulation and/or trend of error over multiple iterations. Controller 36 may apply these gain parameters according to an equation Eq. 1 below:

$$\text{SteeringCommandAdjustment}[n] = K_P \Delta S[n] + \Sigma_0^n K_I \Delta S[n] + K_D(\Delta S[n] - \Delta S[n-1]) \quad \text{Eq. 1}$$

Sensor 38 may embody a rotational speed sensor configured to generate a signal indicative of a speed of the associated traction motor 28. In one embodiment, sensor 38 is imbedded within and forms a portion of traction motor 28. In other embodiments, sensor 38 is a standalone component associated with sprocket 22, final drive 30, a shaft connecting motor 28 to final drive 30, or another rotating component of machine 10. Signals generated by sensor 38 may be directed to controller 36 for further processing.

INDUSTRIAL APPLICABILITY

The disclosed steering control system may be implemented into any mobile machine application where steering instability is undesirable. The disclosed steering control system may help reduce steering inaccuracies and/or instabilities by independently accounting for differences in loading on traction devices 16. Operation of steering control system 34 will now be described with respect to FIG. 2 and the maps of FIGS. 3-6.

As illustrated in FIG. 2, control may begin with receipt of a desired steering input (Step 200) and a desired machine speed (Step 205). As discussed above, the desired steering input and machine speed may be received by way of one or more of input devices 20. For example, as an operator selects a particular gear, manipulates a steering joystick, and/or pushes an acceleration or deceleration pedal, the associated input devices 20 may generate corresponding signals indicative of the desired speed and steering of machine 10. These signals may be directed to controller 36 for processing. It is contemplated that steps 200 and 205 may be completed in any order or simultaneously, as desired.

Throughout machine operation, controller 36 may determine an actual steering of machine 10 (Step 210). The actual machine steering may be a function of a speed differential between the left and right traction devices 16, as detected via sensors 38. Controller 36 may then determine a steering error by comparing the desired steering of machine 10 with the actual machine steering (Step 215). For example, assuming that straight travel is desired (i.e., that desired steering is zero or that the speeds of left and right motors 28 are desired to be equal) and that actual steering is −500 rpm (i.e., that left travel motor 28 is spinning 500 rpm faster than right motor 28), then the steering error would be −500 rpm (e.g., 500 rpm right motor speed−1000 rpm left motor speed=−500 rpm). Unless otherwise corrected or accounted for, this steering error may cause machine 10 to turn to the right at a time when the operator is expecting machine 10 to travel in a straight forward direction.

At some point after the completion of step 205, controller 36 may determine a deadband based on the desired machine travel speed (Step 220). The deadband may be a speed-dependent value used to selectively reduce the steering error determined in steps 210-215. It may be desirable to reduce the steering error, in some instances, to provide more responsive and/or stable machine control. That is, by selectively reducing the steering error, a number and/or magnitude of resulting steering adjustments made to machine 10 may likewise be reduced. As shown in the exemplary map of FIG. 3, at lower speeds, the deadband may also be low (e.g., zero), allowing for larger and more responsive steering correction to be implemented at these speeds. And as the desired machine speed increases, the deadband may likewise increase, such that the number and/or magnitude of the steering changes implemented at higher speeds is reduced to a more controllable level. In one embodiment, the deadband may reach a maximum value before the desired speed of machine 10 reaches its maximum limit. In this embodiment, the deadband maximum value may be about 50 rpm.

Controller 36 may also determine a deadband multiplier, in some instances, based on a torque difference being experienced by left and right motors 28 (Step 225). The deadband multiplier may be used to selectively adjust the deadband value determined in step 220, such that when left and right motors 28 are experiencing about the same amount of torque (i.e., when the load on motors 28 is about balanced), the deadband value may be reduced to zero by the multiplier. In this way, the resulting adjusted deadband value may be representative of both machine speed and loading. As shown in the exemplary map of FIG. 4, as the magnitude (i.e., the absolute value) of the difference between the command torque or torque output of motors 28 increases, the deadband multiplier may likewise increase up to a maximum value.

After completion of steps 215 and 225, controller 36 may be configured to reduce the steering error by an amount that is functionally related to the deadband and the deadband multiplier (Step 230). For example the reduced steering error may be about equal to the steering error determined in step 215, minus the product of the deadband value and the deadband multiplier. The steering error may be reduced down to a low limit of zero, and is the same steering error $\Delta S$ used in EQ. 1 above.

Controller 36 may be configured to determine the $K_I$ parameter from EQ. 1 based on the desired steering of machine 10 (Step 235). In particular, the $K_I$ parameter may be determined from the exemplary map of FIG. 5 based on a magnitude (i.e., the absolute value of) the desired steering. According to the exemplary map of FIG. 5, as the desired steering reduces, the value of the $K_I$ parameter used EQ. 1 goes up. In this manner, larger steering corrections may be implemented when overall desired steering is low (i.e., when primarily straight travel is desired), and vice versa. This may provide accurate control over lower steering input, and allow the operator to manually provide the necessary correction during higher steering input.

Controller 36 may also selectively determine a $K_I$ gain multiplier based on the torque difference being experienced by left and right motors 28 (Step 240). As shown in the exemplary map of FIG. 4, the $K_I$ gain multiplier may be used to selectively adjust the value of the $K_I$ parameter, such that when left and right motors 28 are experiencing about the same amount of torque (i.e., when the load on motors 28 is about balanced), the $K_I$ gain may be reduced by the multiplier. And as the magnitude (i.e., the absolute value) of the difference between the command torque or torque output of motors 28 increases, the $K_I$ gain multiplier may likewise increase.

After completion of step 240, controller 36 may be configured to determine a steering adjustment that should be made to correct the deadband-reduced steering error (Step 245). This steering adjustment may be a reduction of a speed currently being commanded of one of left and right motors 28, and calculated using EQ. 1. Controller 36 may determine which of left and right traction motors 28 to direct the reduced speed command to based on a comparison of a sign of the desired machine speed and a sign of the steering error (Step 250). The sign of the desired machine speed may be associated with the travel speed being in a forward direction (+) or in a reverse direction (−). In step 245, controller 36 may determine if the signs are the same (i.e., equal) or opposite.

When the steering error sign is the same as the desired machine speed sign (step 250: Y), the reduced speed command may be directed to right travel motor 28 and be equal to the current motor command minus the steering adjustment determined from EQ. 1 (Step 255). However, when the steering error sign is the opposite of the desired machine speed sign (step 250: N), the reduced speed command may instead be directed to left travel motor 28 and be equal to the current motor command plus the steering adjustment (Step 260). Control may return from steps 255 and 260 to steps 200 and 205.

The disclosed steering control system may have wide applicability and provide multiple benefits. In particular, the system may be applicable to any machine that has a multi-path electric drive, including machines with or without steerable front traction devices. In addition, the system may help maintain straight travel of the machine when steering is undesired, and greater control over steering when steering is desired.

It will be apparent to those skilled in the art that various modifications and variations can be made to the disclosed steering control system. Other embodiments will be apparent to those skilled in the art from consideration of the specification and practice of the disclosed steering control system. It is intended that the specification and examples be considered as exemplary only, with a true scope being indicated by the following claims and their equivalents.

What is claimed is:

1. A steering control system for a machine having left and right traction devices, the steering control system comprising:
a left motor configured to drive the left traction device;
a right motor configured to drive the right traction device;
at least one input device configured to generate a first signal indicative of a desired machine speed and a second signal indicative of desired machine steering;
a left speed sensor configured to generate a third signal indicative of a rotational speed of the left motor;
a right speed sensor configured to generate a fourth signal indicative of a rotational speed of the right motor; and
a controller in communication with the left motor, the right motor, the at least one input device, the left speed sensor, and the right speed sensor, the controller being configured to:
determine a difference between desired machine steering and actual machine steering based on the second, third, and fourth signals;
determine a steering command change that should be implemented based on the difference;
determine a gain based on the second signal and a difference between current torque commands of the left and right motors;
adjust the steering command change as a function of the gain; and
selectively apply the adjusted steering command change to one of the left and right motors.

2. The steering control system of claim 1, wherein the gain decreases as the desired steering increases.

3. The steering control system of claim 1, wherein the gain increases after the difference between current torque commands of the left and right motors exceeds a threshold difference, and increases by an amount related to the difference between the current torque commands of the left and right motors.

4. The steering control system of claim 1, wherein the controller is further configured to:
determine a deadband based on the first signal; and
reduce the difference by the deadband prior to determining the steering command change.

5. The steering control system of claim 4, wherein the controller is configured to reduce the difference by the deadband down to a zero value limit.

6. The steering control system of claim 4, wherein:
the deadband is zero from a zero machine speed to a first threshold speed;
the deadband increases proportional to a machine speed from the first threshold speed to a second threshold speed; and
the deadband remains at a constant value for machine speeds greater than the second threshold speed.

7. The steering control system of claim 4, wherein the controller is further configured to:
determine a deadband multiplier based on a difference between current torque commands of the left and right motors; and
selectively reduce the difference as a function of both the deadband and the deadband multiplier prior to determining the steering command change.

8. The steering control system of claim 7, wherein:
the deadband multiplier is zero when the difference between current torque commands of the left and right motors is zero;
the deadband multiplier increases proportional to the difference between current torque commands of the left and right motors when the difference between current torque commands of the left and right motors increases from a first difference to a second difference; and the deadband multiplier remains at a constant value for differences between current torque commands of the left and right motors that are greater than the second difference.

9. The steering control system of claim 1, wherein the controller is further configured to:
    make a comparison of a sign of the steering command change to a sign of the first signal; and
    selectively apply the adjusted steering command change to the one of the left and right motors based on the comparison.

10. The steering control system of claim 9, wherein the controller is configured to add the adjusted steering command change to a current steering command of the left motor when the comparison indicates the sign of the steering command change is the opposite of the sign of the first signal.

11. The steering control system of claim 9, wherein the controller is configured to subtract the adjusted steering command change from a current steering command of the right motor when the comparison indicates the sign of the steering command change is the same as the sign of the first signal.

12. A method of controlling steering of a machine having an electric drive with left and right motors, the method comprising:
    receiving input indicative of a desired speed and a desired steering of the machine;
    sensing a rotational speed of the left motor;
    sensing a rotational speed of the right motor;
    determining a difference between desired steering and actual steering based on the input indicative of the desired steering, the rotational speed of the left motor, and the rotational speed of the right motor;
    determining a steering command change that should be implemented based on the difference;
    determining a gain based on the desired steering and a difference between current torque commands of the left and right motors;
    adjusting the steering command change as a function of the gain; and
    selectively applying the adjusted steering command change to one of the left and right motors.

13. The method of claim 12, further including:
    determining a deadband based on the input indicative of desired speed; and
    reducing the difference by the deadband prior to determining a torque change.

14. The method of claim 13, wherein reducing the difference includes reducing the difference by the deadband down to a zero value limit.

15. The method of claim 13, further including:
    determining a deadband multiplier based on a difference between current torque commands of the left and right motors; and
    selectively reducing the difference as a function of both the deadband and the deadband multiplier prior to determining the torque change.

16. The method of claim 12, further including:
    making a comparison of a sign of the steering command change to a sign of the desired speed; and
    selectively applying the adjusted steering command change to one of the left and right motors includes:
        adding the adjusted steering command change to a current steering command of the left motor when the comparison indicates the sign of the steering command change is the opposite of the sign of the desired speed; and
        subtracting the adjusted steering command change from a current steering command of the right motor when the comparison indicates the sign of the steering command change is the same as the sign of the desired speed.

17. A machine, comprising:
    a frame;
    an undercarriage configured to support the frame and having left and right tracks;
    an engine mounted to the frame;
    a generator mounted to the frame and driven by the engine to produce electricity;
    a left traction motor configured to receive electricity produced by the generator and to drive the left track;
    a right traction motor configured to receive electricity produced by the generator and to drive the right track;
    at least one input device configured to generate a first signal indicative of a desired machine speed and a second signal indicative of desired machine steering;
    a left speed sensor configured to generate a third signal indicative of a rotational speed of the left motor;
    a right speed sensor configured to generate a fourth signal indicative of a rotational speed of the right motor; and
    a controller in communication with the left motor, the right motor, the at least one input device, the left speed sensor, and the right speed sensor, the controller being configured to:
        determine a difference between desired machine steering and actual machine steering based on the second, third, and fourth signals;
        determine a deadband based on the first signal and based on a difference between current torque commands of the left and right motors;
        reduce the difference by the deadband;
        determine a steering command change that should be implemented based on the deadband-reduced difference;
        determine a gain based on the second signal and based on a difference between current torque commands of the left and right motors;
        adjust the steering command change as a function of the gain;
        make a comparison of a sign of the steering command change to a sign of the first signal;
        selectively add the adjusted steering command change to a current steering command of the left motor when the comparison indicates the sign of the steering command change is the opposite of the sign of the first signal; and
    selectively subtract the adjusted steering command change from a current steering command of the right motor when the comparison indicates the sign of the steering command change is the same as the sign of the first signal.

* * * * *